United States Patent
Chang

(10) Patent No.: US 9,726,800 B2
(45) Date of Patent: Aug. 8, 2017

(54) ILLUMINATION MODULE HAVING LIGHT DIFFUSING FIBER

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 195 days.

(21) Appl. No.: 14/698,484

(22) Filed: Apr. 28, 2015

(65) Prior Publication Data
US 2016/0216430 A1    Jul. 28, 2016

(30) Foreign Application Priority Data
Jan. 22, 2015   (CN) .......................... 2015 1 0030355

(51) Int. Cl.
*F21V 8/00*    (2006.01)
*G02B 6/02*    (2006.01)
*G02B 6/42*    (2006.01)
*G02B 5/02*    (2006.01)

(52) U.S. Cl.
CPC .......... *G02B 6/0005* (2013.01); *G02B 5/0221* (2013.01); *G02B 6/02052* (2013.01); *G02B 6/423* (2013.01)

(58) Field of Classification Search
CPC ........ G02B 6/0005; G02B 5/0294; F21K 9/52
See application file for complete search history.

(56) References Cited

U.S. PATENT DOCUMENTS

2008/0158905 A1*  7/2008  Chuang ................. G02B 6/001
                                                                362/581
2010/0210910 A1*  8/2010  Shimotsu ........... G02B 23/2469
                                                                600/178

* cited by examiner

Primary Examiner — Elmito Breval
(74) Attorney, Agent, or Firm — Steven Reiss

(57) ABSTRACT

An illumination module includes a light source and a light diffusion fiber coupled to the light source. The light diffusion fiber defines a plurality of indent cuts at an outer sidewall thereof. An arrangement density of the indent cuts gradually decreases along a direction away from the light source.

10 Claims, 5 Drawing Sheets

ILLUMINATION MODULE HAVING LIGHT DIFFUSING FIBER

FIELD

The subject matter herein generally relates to a light emitting component, especially relates to an illumination module having light diffusing fiber.

BACKGROUND

LEDs (light emitting diodes) have low power consumption, high efficiency, quick reaction time, long lifetime, and the absence of toxic elements such as mercury during manufacturing. Due to those advantages, traditional light sources are gradually replaced by LEDs.

A conventional illumination module includes a substrate, an LED package arranged on the substrate, and a light diffusion plate located at a light path of the LED package. Light emitted by the LED package enters the light diffusion plate via an incident surface of the light diffusion plate and thereby radiates out of the light diffusion plate. However, the light entering the light diffusion plate is easily distributed uneven, which leads to a light brightness of the light diffusion plate gradually decreasing along a direction away from the light package. Such that, a brightness of the illumination module will be not uniform.

BRIEF DESCRIPTION OF THE DRAWINGS

Implementations of the present technology will now be described, by way of example only, with reference to the attached figures.

DETAILED DESCRIPTION

Figure 1:
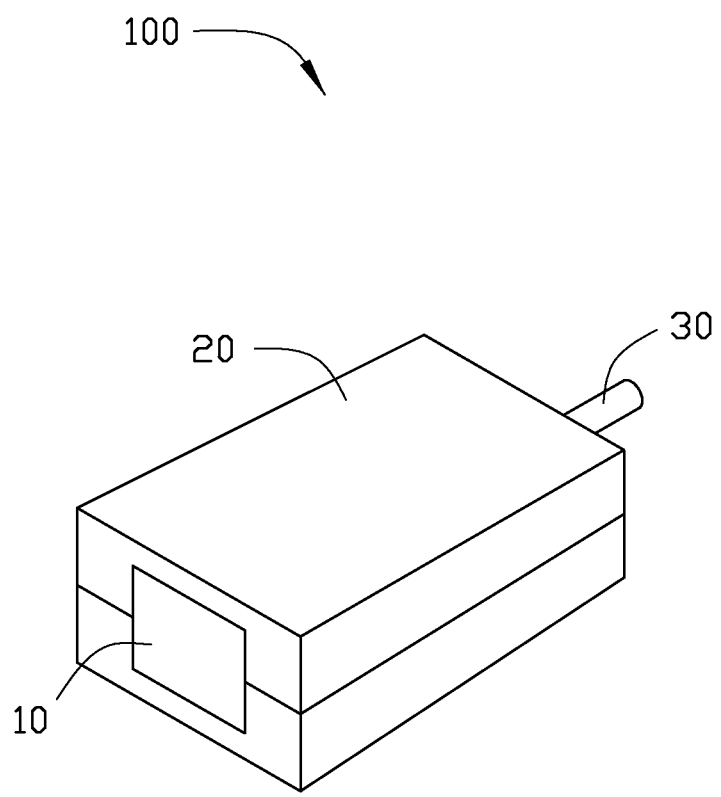
FIG. 1 is an assembled view of an illumination module in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
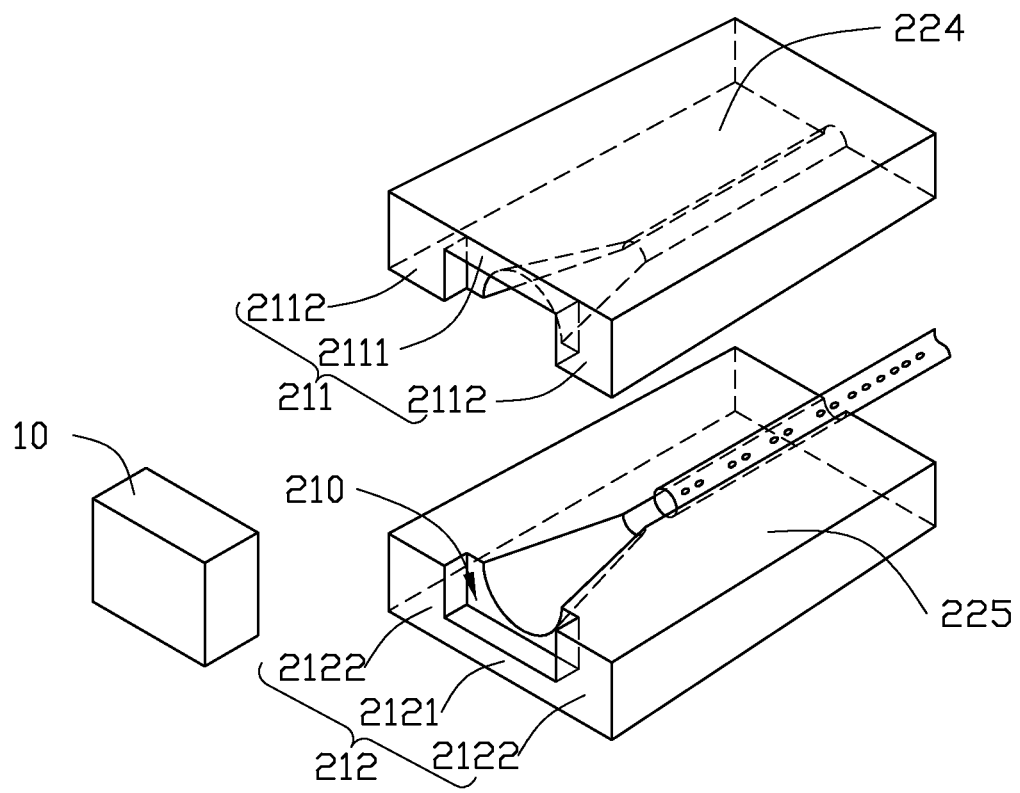
FIG. 2 is an exploded view of the illumination module of FIG. 1.
Figure 3:
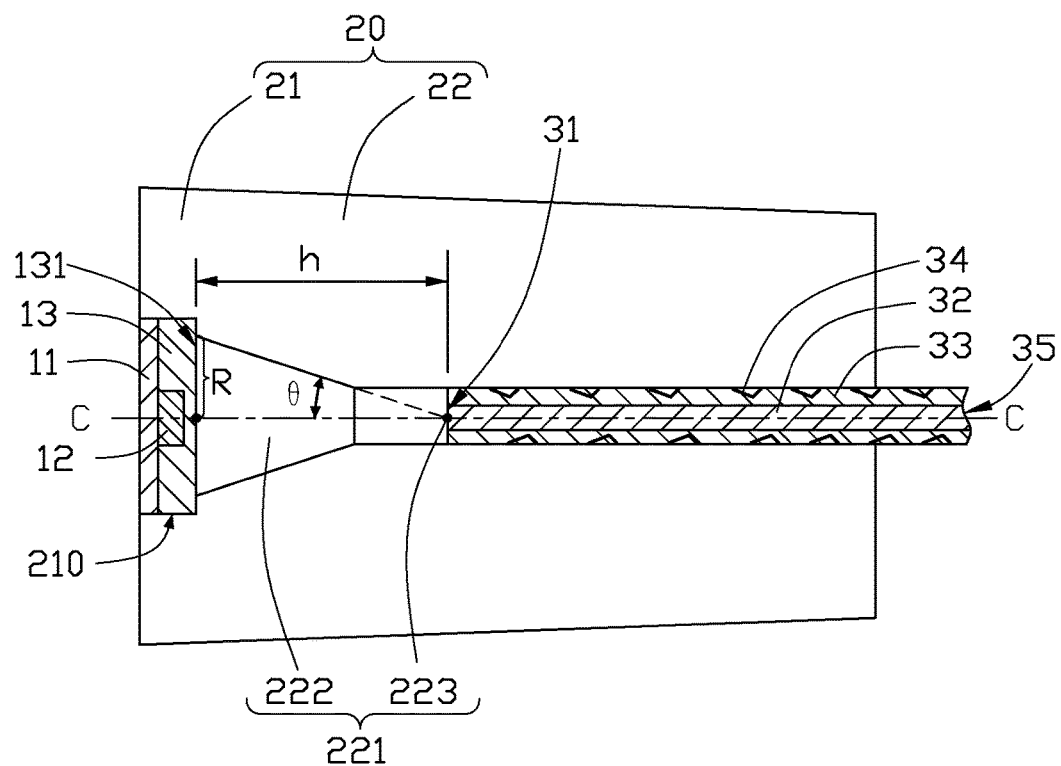
FIG. 3 is a cross sectional view of the illumination module of FIG. 1.

FIGS. 1 to 3 illustrate an illumination module 100 in accordance with a first exemplary embodiment of the present disclosure. The illumination module 100 includes a light source 10, a connecting portion 20 arranged one side of the light source 10, and a diffusion fiber 30 coupled to the light source 10.

Specifically, in this embodiment, the light source 10 is an LED package. The light source 10 includes a substrate 10, an LED die 12 arranged on the substrate and an encapsulation layer 13 covering the LED die 12. The encapsulation layer 13 includes a light emitting surface 131. Alternatively, in other embodiment, the light source 10 can include a plurality of LED dies 12. For example, the light source 10 can be formed by cooperatively packaging RGB dies and the encapsulation layer 13. Alternatively, the light source 10 can be a laser emitting diode.

The connecting portion 20 is arranged between the light source 10 and the diffusion fiver 30. The connecting portion 20 includes a carry portion 21 and a light coupling portion 22.

Specifically, the carry portion 21 is square and annular shaped. The carry portion 21 defines a positioning hole 210 for receiving the light source 10. The carry portion 21 includes an upper subunit 211 and a lower subunit 212 combined together. A shape of the upper subunit 211 is same to that of the lower subunit 212. The upper subunit 211 and the lower subunit 212 cooperatively define the positioning hole 210. In this embodiment, both the upper subunit 211 and the lower subunit 212 are "U" shaped.

The upper subunit 211 includes a first main body 2111 and two first limiting portion 2112 located two opposite sides of the first main body 2111. A height of each first limiting portion 2112 is greater than that of the first main body 2111. In this embodiment, a top surface of the first main body 2111 is coplanar with top surfaces of the two first limiting portions 2112. A bottom surface of the first main body 2111 is higher than bottom surfaces of the two first limiting portion 2112.

The lower subunit 212 includes a second main body 2121 and two second limiting portion 2122 located two opposite sides of the second main body 2121. A height of each second limiting portion 2112 is greater than that of the second main body 2121. In this embodiment, a bottom surface of the second main body 2121 is coplanar with bottom surfaces of the two second limiting portions 2122. A top surface of the second main body 2121 is lower than top surfaces of the two second limiting portion 2122.

The light coupling portion 22 is sandwiched between the carry portion 21 and the light diffusion fiber 30. The light coupling portion 22 is a trapeziform block. A width of the light coupling portion 22 gradually decreases along direction from the carry portion 21 to the light diffusion fiber 30. The light coupling portion 22 defines a light coupling hole 221. The light coupling hole 221 extends through the light coupling portion 22 along the direction from the carry portion 21 to the light diffusion fiber 30. The light coupling hole 221 includes a light guiding hole 222 near to the carry portion 21 and a receiving hole 223 near to the light diffusion fiber 30. The light guiding hole 222 is communicated with the receiving hole 223.

Specifically, an aperture of the light guiding hole 222 gradually decreases along a direction toward the receiving hole 223. Preferably, a configuration of the light guiding hole 222 is taper-shaped. A maximum aperture of the light guiding hole 222 is smaller than an aperture of the positioning hole 210, it namely that an end surface of the light coupling portion 22 resisting the carry portion 21 is partly exposed. Alternatively, an inner surface of the light coupling portion 222 corresponding to the light guiding hole 222 can be coated reflective materials to strengthen light reflection. The reflective materials can be aluminum (Al), argentums (Ag), cuprum (Cu) and so on.

The receiving hole 223 has a consistent aperture. Preferably, the receiving hole 223 is circular. The aperture of the receiving hole 223 is equal to a minimum aperture of the light guiding hole 222. The aperture of the receiving hole 223 is matched with a size/dimension of the light diffusion fiber 30.

In this embodiment, the light coupling portion 22 includes an upper sub-portion 224 and a lower sub-portion 225. It is namely that the light coupling portion 22 is divided into two portions. The upper sub-portion 224 and the lower sub-portion 225 have the same shape and size/dimension. The upper sub-portion 224 and the lower sub-portion 225 each defines a half-groove. The two half-grooves cooperatively forms the light coupling hole 221. In this embodiment, the upper sub-portion 224 and the upper subunit 211 are integrally formed as a single piece. The lower sub-portion 225 and the lower subunit 212 are integrally formed as a single piece. Alternatively, in other embodiment, the carry portion 21 and the light coupling portion 22 can be respectively formed first and thereby combined together.

The light diffusion fiber 30 is directly connected with the light coupling portion 22 and extend out of the light coupling portion 22 from one end thereof away from the carry portion 21. Specifically, a coupling end 31 of the light diffusion fiber 30 is received in the receiving hole 223 of the light coupling portion 22. The light diffusion fiber 30 includes a fiber core 32 and a cladding layer 33 surrounding the fiber core 32. The cladding layer 33 is the outer sidewall of the light diffusion fiber 30. The light diffusion fiber 30 has a central axis C-C. In this embodiment, a light axis of the light source 10 is aligned with the central axis C-C of the light diffusion fiber 30. It is namely that the light source 10 rightly faces the light diffusion fiber 40.

Specifically, the fiber core 32 can be made of silicon. A reflective index of the cladding layer 33 is smaller than that of the fiber core 32. It is namely that the cladding portion 33 can have low refractive index to make the light diffusion fiber 30 having a high numerical aperture (NA, numerical aperture). The cladding layer 33 can be made of a low index polymer such as thermally curable fluoroacrylate or silicone.

Figure 4:
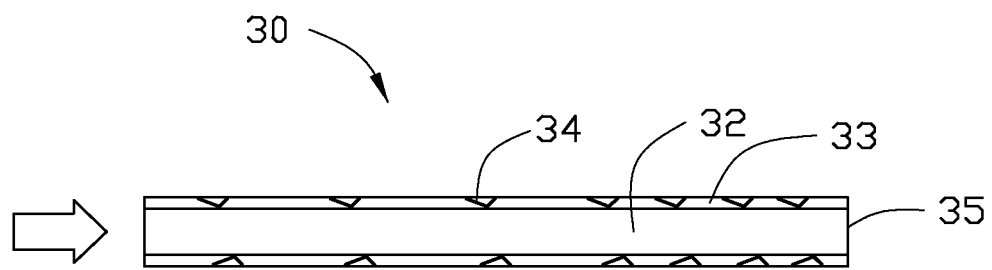
FIG. 4 is a cross sectional view of a diffusion fiber contained in the illumination module of FIG. 1.
Figure 5:
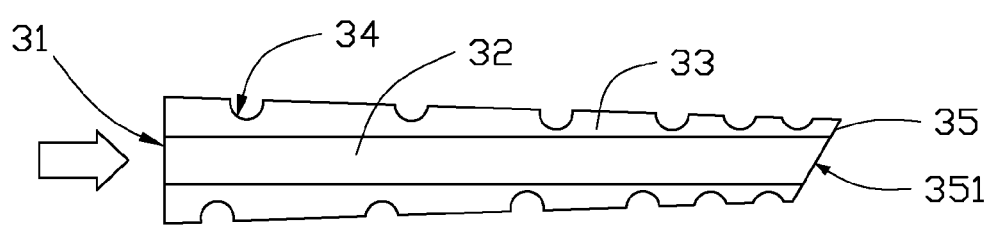
FIG. 5 is a cross sectional view of a diffusion fiber contained in an illumination module in accordance with another exemplary embodiment of the present disclosure.

Referring to FIGS. 4 and 5, the cladding layer 33 is etched to have a plurality of indent cuts 34 for radiating out light in the light diffusion fiber 30 via an outer sidewall of the light diffusion fiber 30. It is namely that the indent cuts 34 are defined at the outer sidewall of the light diffusion fiber 30. An arrangement density of the indent cuts 34 gradually increases along a direction away from the light source 10, accordingly, a brightness of the light diffusion fiber 30 is even along an axis direction thereof, and a brightness of the illumination module 100 is uniform. The indent cuts 34 are "V" shaped or "U" shaped. Alternatively, in other embodiment, depth of the indent cuts 34 can gradually increase along the direction away from the light source 10. Referring to FIG. 5, a thickness of the light diffusion fiber 30 can gradually decrease along the direction away from the light source 10 to strengthen an even brightness of the illumination module 100. In addition, an end surface 351 of an free end 35 of the light diffusion fiber 30 away from the light source 10 can be designed to be inclined to enhance a light radiation of the light diffusion fiber 30.

When the illumination module 100 is assembled. The light source 10 is arranged at the second main body 2121 of the lower subunit 212, and the coupling end 31 of the light diffusion fiber 30 is received in the half-groove of the lower sub-portion 225, thereafter the upper subunit 211 is combined to the lower subunit 212, finally the upper sub-portion 224 is combined to the lower sub-portion 225.

Referring to FIG. 3, an arrangement of the light coupling end 31 of the light diffusion fiber 30 should satisfy: R/h=tan(arcsin(NA)); wherein "R" stands for a distance between the center point of the light emitting surface 131 of the light source 10 and the edge of the light emitting surface 131; "h" stands for a distance between the center point of the light emitting surface 131 of the light source and the light coupling end 31 of the light diffusion fiber 30; "NA" stands for the numerical aperture of the light diffusion fiber 30. An angle θ associated with the numerical aperture of the light diffusion fiber 30 is defined between the central axis C-C of the light diffusion fiber 30 and a line which is through the center O of the light coupling end of the light diffusion fiber 30 and any point P which is located at the inner surface of the light coupling portion 22, and sin θ=NA. Accordingly, light from the light source 10 is coupled to the light diffusion fiber 30 and is concentrated in the range of the numerical aperture NA of the light diffusion fiber 30.

The embodiments shown and described above are only examples. Many details are often found in the art such as the other features of manual screwdrivers. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An illumination module, comprising:
   a light source;
   a light diffusion fiber coupled to the light source, wherein the light diffusion fiber defines a plurality of indent cuts at an outer sidewall thereof, an arrangement density of the indent cuts gradually increasing along a direction away from the light source; and
   a light coupling portion arranged between the light source and the light diffusion fiber, a width of the light coupling portion gradually decreasing along a direction from the light source toward the light diffusion fiber, the light coupling portion defining a light coupling hole at a center thereof, the light coupling hole prong the light coupling portion along the direction from the light source toward the light diffusion fiber, light emitted by the light source being coupled to the light diffusion fiber via the light coupling hole.

2. The illumination module of claim 1, wherein the light coupling hole comprises a light guiding hole near to the light source and a receiving hole near to the light diffusion fiber, the light guiding hole being communicated with the receiving hole, an aperture of the light guiding hole gradually decreasing along a direction toward the receiving hole, the receiving hole having a consistent aperture, the aperture of the receiving hole being equal to the minimum aperture of the light guiding hole, the light diffusion fiber comprising a light coupling end, the light coupling end is positioned and received in the receiving hole.

3. The illumination module of claim 2, wherein the light source comprises a light emitting surface, the light diffusion fiber comprises a central axes, a light axes of the light source is aligned with the central axes of the light diffusion fiber, and arrangement of the light diffusion fiber satisfying: R/h=tan(arcsin(NA)); wherein "R" stands for a distance between the center point of the light emitting surface of the light source and the edge of the light emitting surface; "h" standing for a distance between the center point of the light emitting surface of the light source and the light coupling end of the light diffusion fiber; "NA" standing for the numerical aperture of the light diffusion fiber.

4. The illumination module of claim 2, wherein the light coupling portion comprises an upper sub-portion and a lower sub-portion combined together, the upper sub-portion and the lower sub-portion having the same shape and size/dimension, the upper sub-portion and the lower sub-portion each defining a half-groove, the two half grooves cooperatively forming the light coupling hole.

5. The illumination module of claim 1, further comprising a carry portion, wherein the carry portion is connected to the light coupling portion, the carry portion defining a positioning hole at a center thereof, the light source being arranged in the positioning hole, the positioning hole being communicated with the light coupling hole, a maximum aperture of the light coupling hole being smaller than that of the positioning hole, an end surface of the light coupling portion resisting the carry portion being partly exposed.

6. The illumination module of claim 5, wherein the carry portion comprises an upper subunit and a lower subunit combined together, the upper subunit and the lower subunit having the same shape and size/dimension, the upper sub-unit and the lower subunit cooperatively defining the positioning hole.

7. The illumination module of claim 5, wherein the light coupling portion and the carry portion are integrally formed as a single piece.

8. The illumination module of claim 1, wherein the light diffusion fiber comprises a fiber core and a cladding layer surrounding the fiber core, a reflective index of the cladding layer being smaller than that of the fiber core, the cladding layer being the outer sidewall of the light diffusion fiber.

9. The illumination module of claim 8, wherein the fiber core is made of silicon, the cladding layer being made of a low index polymer.

10. An illumination module comprising:
a light source;
a connecting block having a first side and a second side substantially opposite the first side; and
a light diffusion fiber having a first end, a second end opposite the first end and an outside wall extending from the first fiber end to the second fiber end, the light diffusion fiber having a first portion nearest the first end, a second portion nearest the second end and a middle portion between the first portion and the second portion;
wherein a positioning space is defined in the first side of the connecting block, the positioning space connecting to a light coupling space defined within the connecting block;
wherein the first end of the light diffusion fiber connects with light coupling space and the light diffusion fiber extends through the connecting block and out the second side of connecting block;
wherein a plurality of indents are defined in the outside wall of the light diffusion fiber;
wherein a first portion of the plurality of indents is arranged on the first fiber portion outside wall, a second portion of the plurality of indents is arranged on the middle fiber portion outside wall and a third portion of the plurality of indents is arranged on the second fiber portion outside wall; and
wherein the first portion of indents is less than the second portion of indents and the second portion of indents is less than the third portion of indents.

* * * * *